US011325641B2

(12) United States Patent
Hara et al.

(10) Patent No.: US 11,325,641 B2
(45) Date of Patent: May 10, 2022

(54) CONTROL DEVICE FOR ELECTRIC POWER STEERING APPARATUS AND ELECTRIC POWER STEERING APPARATUS

(71) Applicant: Hitachi Automotive Systems, Ltd., Hitachinaka (JP)

(72) Inventors: Takafumi Hara, Tokyo (JP); Toshiyuki Ajima, Tokyo (JP); Mitsuo Sasaki, Atsugi (JP); Yoshitaka Iwaji, Tokyo (JP); Shigehisa Aoyagi, Tokyo (JP); Takumi Hisazumi, Atsugi (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 536 days.

(21) Appl. No.: 15/741,041

(22) PCT Filed: Jun. 13, 2016

(86) PCT No.: PCT/JP2016/067499
§ 371 (c)(1),
(2) Date: Dec. 29, 2017

(87) PCT Pub. No.: WO2017/002593
PCT Pub. Date: Jan. 5, 2017

(65) Prior Publication Data
US 2018/0201303 A1 Jul. 19, 2018

(30) Foreign Application Priority Data

Jun. 29, 2015 (JP) .............................. JP2015-129458

(51) Int. Cl.
*B62D 5/04* (2006.01)
*B62D 6/00* (2006.01)
(Continued)

(52) U.S. Cl.
CPC ............... *B62D 5/049* (2013.01); *B62D 5/04* (2013.01); *B62D 5/0463* (2013.01); *B62D 6/00* (2013.01);
(Continued)

(58) Field of Classification Search
None
See application file for complete search history.

(56) References Cited

U.S. PATENT DOCUMENTS 6,184,640 B1 * 2/2001 Kawashima .............. H02P 1/04
310/48
6,906,491 B2 6/2005 Matsuo et al.
(Continued)

FOREIGN PATENT DOCUMENTS

DE 102 07 549 A1 9/2003
DE 103 14 696 A1 10/2004
(Continued)

OTHER PUBLICATIONS

Jtekt Corp; Machine Translation of JP 2010-029028; Feb. 2010; espacenet.com (Year: 2010).*
(Continued)

*Primary Examiner* — David P. Merlino
(74) *Attorney, Agent, or Firm* — Crowell & Moring LLP

(57) ABSTRACT

An object of the present invention is to provide an electric power steering apparatus capable of improving reliability of a drive device for a three-phase synchronous motor without increasing a cost of the drive device. A control device for controlling an electric power steering apparatus according to the present invention is a control device for controlling an electric power steering apparatus using a three-phase synchronous motor as a force assisting in a steering operation, includes: a rotational position estimation unit that estimates a position of a rotor of the three-phase synchronous motor on
(Continued)

the basis of a neutral point potential or a virtual neutral point potential of the three-phase synchronous motor; and a command signal computing unit that computes a command signal to the three-phase synchronous motor on the basis of the position of the rotor estimated by the rotational position estimation unit.

19 Claims, 15 Drawing Sheets

(51) Int. Cl.
| | | |
|---|---|---|
| *H02P 6/182* | (2016.01) | |
| *H02P 27/08* | (2006.01) | |
| *B62D 6/10* | (2006.01) | |
| *B62D 15/02* | (2006.01) | |
| *H02P 6/10* | (2006.01) | |
| *H02P 6/12* | (2006.01) | |
| *H02P 6/16* | (2016.01) | |

(52) U.S. Cl.
CPC ........... *B62D 6/10* (2013.01); *B62D 15/0235* (2013.01); *H02P 6/10* (2013.01); *H02P 6/12* (2013.01); *H02P 6/16* (2013.01); *H02P 6/182* (2013.01); *H02P 27/08* (2013.01); *H02P 2209/01* (2013.01)

(56) References Cited

U.S. PATENT DOCUMENTS

| | | | | |
|---|---|---|---|---|
| 2003/0102861 A1* | 6/2003 | Kushihara | ................ | H02P 6/16 324/207.15 |
| 2004/0046519 A1 | 3/2004 | Leonardi et al. | | |
| 2004/0257027 A1* | 12/2004 | Matsuo | ................... | H02P 21/26 318/722 |
| 2008/0018279 A1* | 1/2008 | Fukamizu | ............... | H02P 6/182 318/432 |
| 2009/0190903 A1* | 7/2009 | Komatsu | ................ | H02P 21/18 388/803 |
| 2009/0200971 A1* | 8/2009 | Iwaji | ........................ | H02P 6/20 318/400.11 |
| 2009/0322269 A1 | 12/2009 | Kondo et al. | | |
| 2010/0066284 A1* | 3/2010 | Iwaji | ....................... | H02P 21/32 318/400.02 |
| 2011/0040519 A1* | 2/2011 | Yeh | .......................... | H02P 6/16 702/145 |
| 2011/0043146 A1 | 2/2011 | Sato | | |
| 2012/0249034 A1* | 10/2012 | Dooley | .................. | H02P 27/08 318/400.35 |
| 2013/0057193 A1* | 3/2013 | Iwaji | ....................... | H02P 6/185 318/721 |
| 2015/0069941 A1* | 3/2015 | Iwaji | ....................... | H02P 6/183 318/400.11 |

FOREIGN PATENT DOCUMENTS

| | | |
|---|---|---|
| DE | 10 2004 019 284 A1 | 11/2005 |
| DE | 10 2009 030 954 A1 | 12/2009 |
| JP | 2001-112282 A | 4/2001 |
| JP | 2004-274947 A | 9/2004 |
| JP | 2005-12997 A | 1/2005 |
| JP | 2009-189176 A | 8/2009 |
| JP | 2010-22196 A | 1/2010 |
| JP | 2010-29028 A | 2/2010 |
| JP | 2012-166776 A | 9/2012 |
| JP | 2013-55744 A | 3/2013 |
| JP | 2014187855 A * | 10/2014 |
| WO | WO 2013/153657 A1 | 10/2013 |
| WO | WO 2014/080456 A1 | 5/2014 |
| WO | WO 2014/162579 A1 | 10/2014 |

OTHER PUBLICATIONS

Osawa Tetsuto; Machine translation of JP-2014187855-A; Oct. 2014; espacenet.com (Year: 2014).*

International Search Report (PCT/ISA/210) issued in PCT Application No. PCT/JP2016/067499 dated Aug. 30, 2016 with English-language translation (five (5) pages).

Japanese-language Written Opinion (PCT/ISA/237) issued in PCT Application No. PCT/JP2016/067499 dated Aug. 30, 2016 (six (6) pages).

Japanese-language Office Action issued in counterpart Japanese Application No. 2018-240816 dated Oct. 29, 2019 with English translation (eight (8) pages).

German-language Office Action issued in German Application No. 11 2016 002 342.1 dated Jul. 2, 2021 with English translation (11 pages).

* cited by examiner

FIG.12
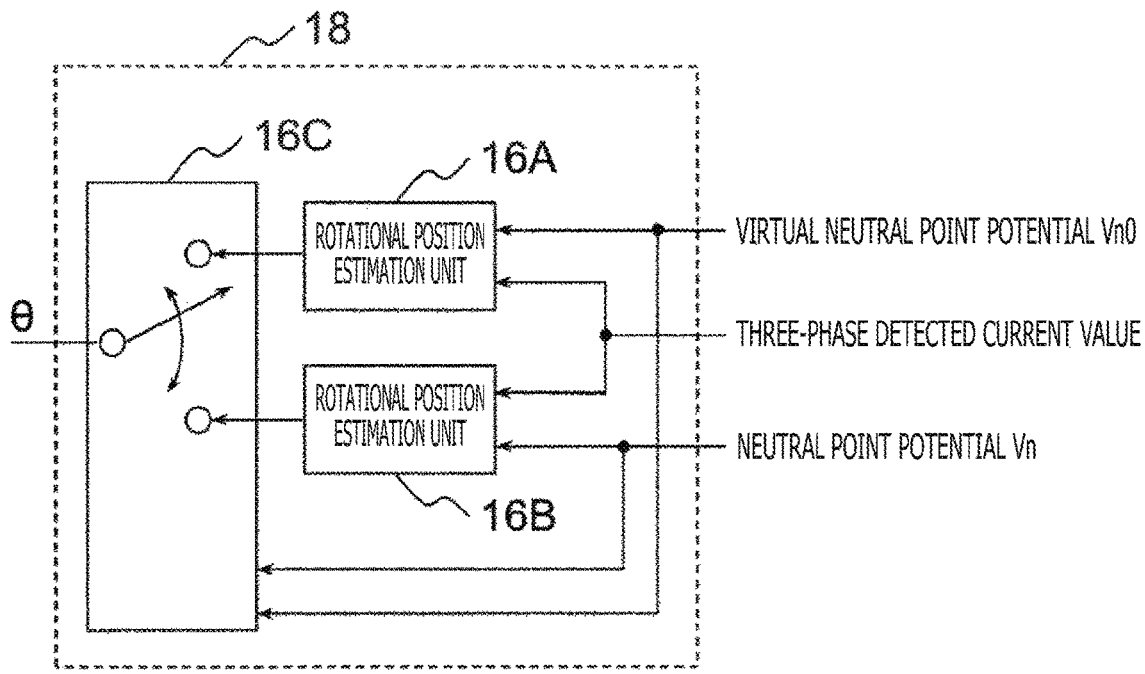
FIG.13
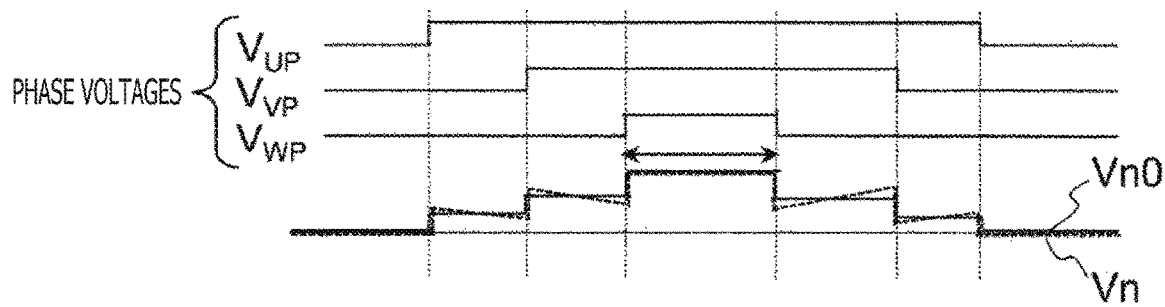
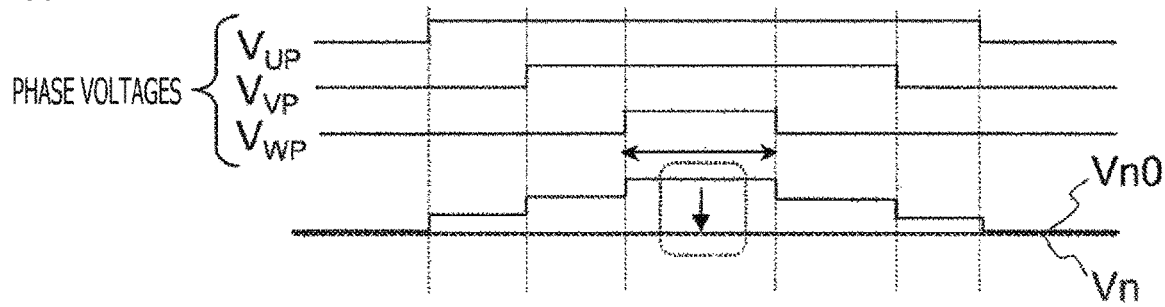

CONTROL DEVICE FOR ELECTRIC POWER STEERING APPARATUS AND ELECTRIC POWER STEERING APPARATUS

TECHNICAL FIELD

The present invention relates to a control device for an electric power steering apparatus and an electric power steering apparatus.

BACKGROUND ART

An electric power steering apparatus employs a small-sized, high efficiency three-phase synchronous motor. However, in the three-phase synchronous motor, a magnetic detection element such as a Hall IC generally detects a rotational position of a rotor provided with a magnet, stator-side armature coils are successively excited on the basis of a result of the detection, and the rotor is rotated. In addition, it is possible to realize driving of the three-phase synchronous motor with a sinusoidal current and reduce vibration and noise due to torque ripples or the like by using a resolver, an encoder, a GMR sensor or the like that is an accurate rotational position detector.

The three-phase synchronous motor is unable to rotate as soon as this rotational position detector fails. The same thing is true for a case in which the resolver, the encoder or the GMR sensor other than the Hall IC is used as the rotational position detector. Since such a failure in the rotational position detector causes a malfunction or an abnormal operation of the electric power steering apparatus, improvement has been demanded.

According to Patent Document 1, when such a rotational position detector fails, rotational position estimation means, other than the rotational position detector that estimates a position from an induced voltage and an induced current induced by a magnet of a three-phase synchronous motor, is used as an alternative to an output from the rotational position detector. It is thereby possible to stably drive the three-phase synchronous motor even when the rotational position detector fails. However, when a rotational speed of the three-phase synchronous motor is lower than 10% of a rated speed, the induced voltage is buried in the noise and this rotational position estimation means is, therefore, unable to detect the position of a rotor at the low speed. Particularly in a case of an electric power steering, the three-phase synchronous motor for use in assisting in a steering operation is used at the rotational speed that is a zero speed or nearly the zero speed, so that the rotational position estimation means of Patent Document 1 is disadvantageously unable to estimate the position.

As an alternative to the rotational position estimation means based on the induced voltage and incapable of estimating the rotational position at the zero speed or the low speed, the number of the rotational position detectors is increased to two or more while the one rotational position detector is normally used. It is thereby possible to ensure detection with rotational position accuracy of the rotational position detectors at the zero speed or the low speed equivalent to that before the failure. Nevertheless, in the electric power steering, it is difficult to increase the number of the rotational position detectors that is hardware due to restrictions on a loading space and a cost.

To address these problems, there is proposed rotational position estimation means that is software for a low-speed range based on 120-degree conduction control over a synchronous motor by a virtual neutral point potential as disclosed in, for example, JP, A2009-189176 (Patent Document 2). It is thereby possible to control the three-phase synchronous motor even in the low-speed range in which an induced voltage is low. Furthermore, there is proposed rotational position estimation means that estimates a rotational position from a neutral point potential of three-phase windings as disclosed in JP, A2013-55744 (Patent Document 3). It is thereby possible to drive a synchronous motor with a sinusoidal wave even in a low-speed range in which an induced voltage is low.

PRIOR ART DOCUMENTS

Patent Documents

Patent Document 1: JP-2010-022196-A
Patent Document 2: JP-2009-189176-A
Patent Document 3: JP-2013-055744-A

SUMMARY OF THE INVENTION

Problems to be Solved by the Invention

The technique described in Patent Document 1 has a problem that it is impossible to estimate the position in an operating range of the three-phase synchronous motor in which the three-phase synchronous motor is frequently used in the electric power steering while continuous driving required for the electric power steering can be realized by using the rotational position estimation means that is the software as an alternative to the rotational position detector that is the hardware when the rotational position detector fails.

Each of the techniques described in Patent Documents 2 and 3 can estimate the position of the rotor in the operating range of the three-phase synchronous motor in which the three-phase synchronous motor is frequently used in the electric power steering by estimating the position by the virtual neutral point potential or the neutral point potential. However, Patent Documents 2 and 3 do not indicate how the position estimation is made along with the position detector that is originally used in the electric power steering and how to handle a failure in the position detector.

An object of the present invention is to provide an electric power steering apparatus capable of improving reliability of a drive device for a three-phase synchronous motor without increasing a cost of the drive device.

Means for Solving the Problems

A control device for controlling an electric power steering apparatus according to the present invention is a control device for controlling an electric power steering apparatus using a three-phase synchronous motor for a force assisting in a steering operation, includes: a rotational position estimation unit that estimates a position of a rotor of the three-phase synchronous motor on the basis of a neutral point potential or a virtual neutral point potential of the three-phase synchronous motor; and a command signal computing unit that computes a command signal to the three-phase synchronous motor on the basis of the position of the rotor estimated by the rotational position estimation unit.

Effect of the Invention

An electric power steering apparatus according to a preferred embodiment of the present invention estimates a position of a rotor on the basis of a signal of either a neutral point potential or a virtual neutral point potential in a zero speed or low speed operating range in which a three-phase synchronous motor is frequently used in an electric power steering, and drives the three-phase synchronous motor, thereby making it possible to continue assisting in a steering operation.

The other objects and characteristics of the present invention will be apparent from the embodiments described below.

BRIEF DESCRIPTION OF THE DRAWINGS

FIG. 12 is a block diagram illustrating a configuration of a rotational position estimation/comparison unit 18.

FIG. 13 outlines breaking detection in an open failure in a neutral point potential derivation line.

MODES FOR CARRYING OUT THE INVENTION

Figure 1:
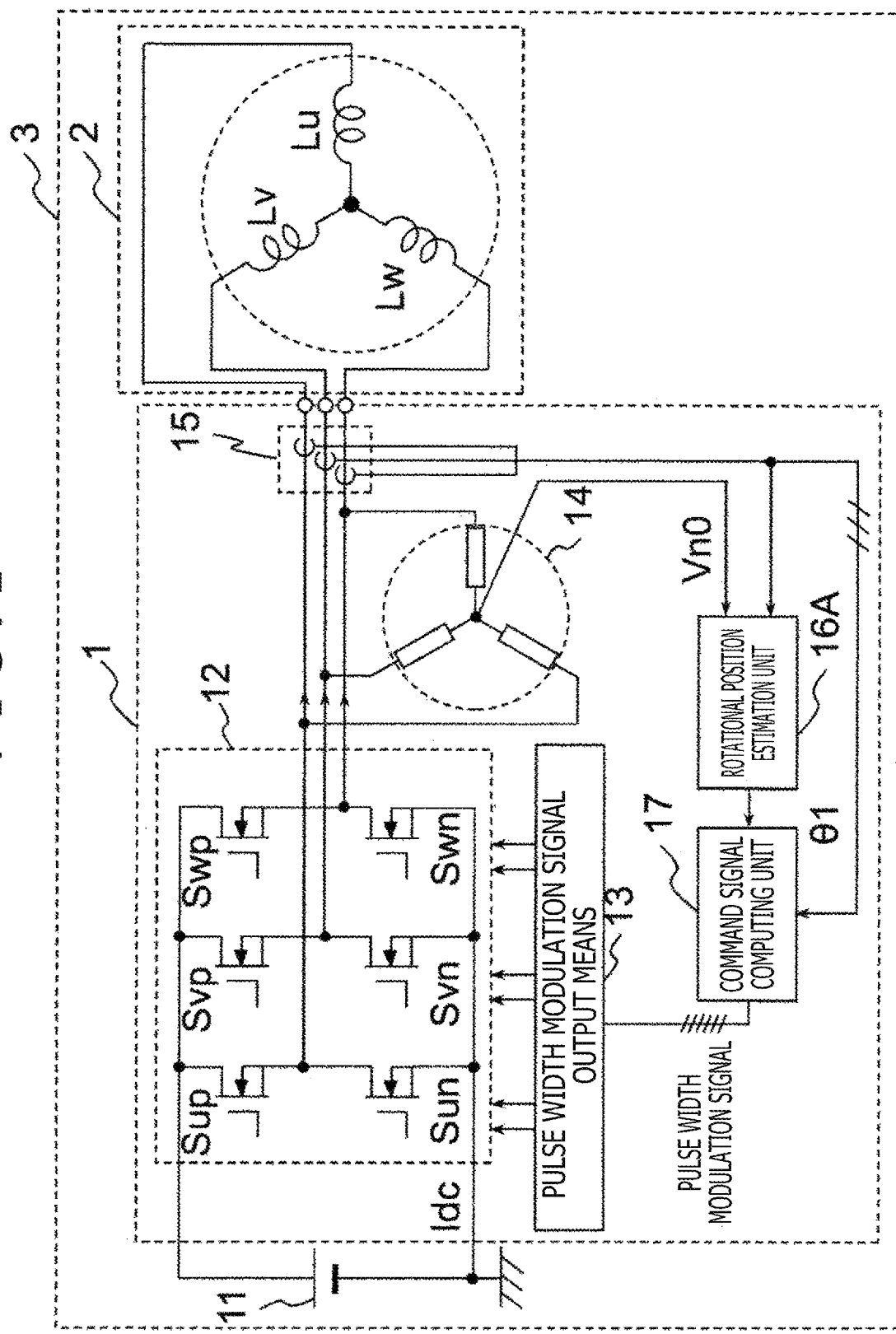
FIG. 1 is a configuration diagram of a drive device according to a first embodiment.

Embodiments of an electric power converter according to the present invention will be described hereinafter with reference to the drawings. It is noted that same elements are denoted by same reference characters in the drawings and repetitive description is omitted.

Figure 17:
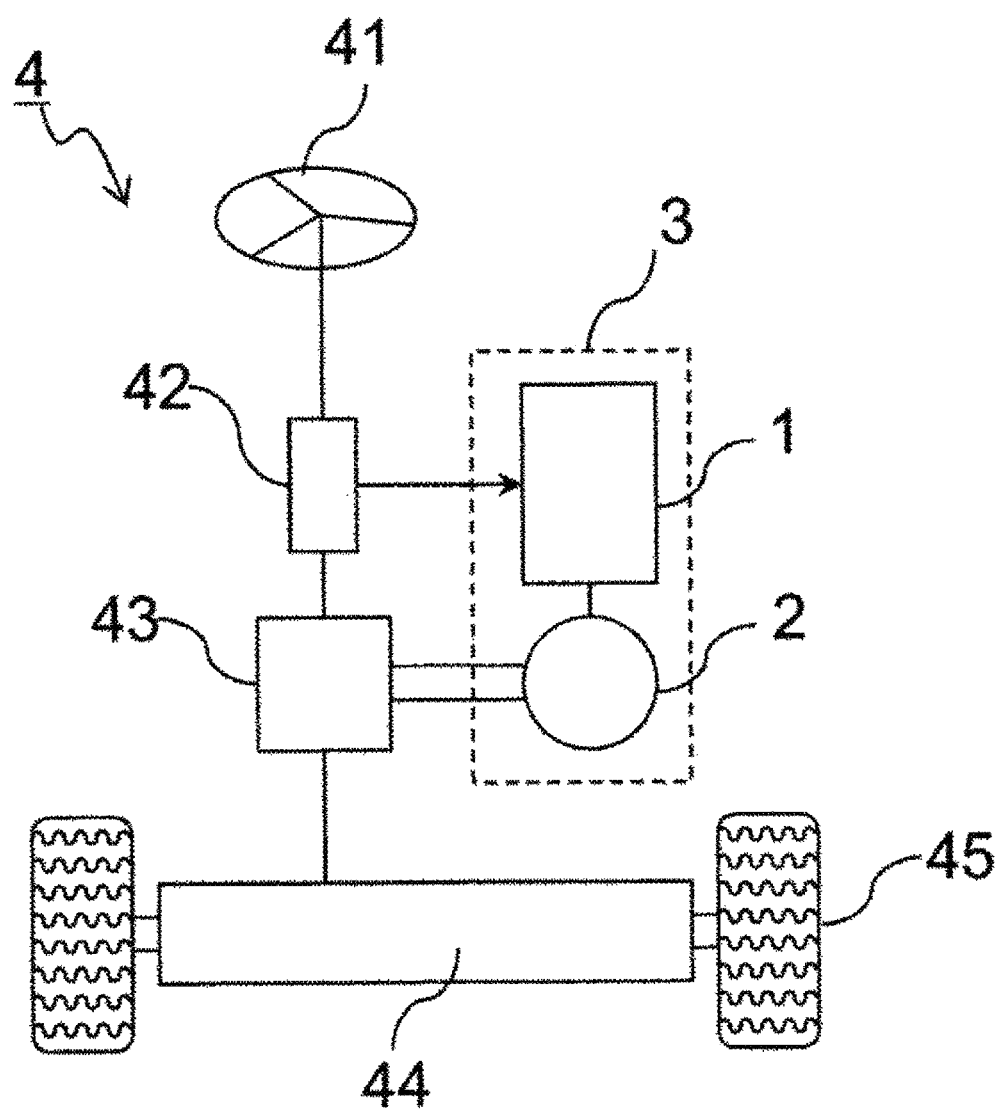
FIG. 17 illustrates an example of a configuration of an electric power steering apparatus.

FIG. 17 illustrates a configuration of an electric power steering apparatus 4. When a driver operates a steering wheel 41, a torque sensor 42 detects a rotation torque of the steering wheel 41. The torque detected by the torque sensor 42 is input to a drive device 3. The drive device 3 includes a three-phase synchronous motor 2 and a printed circuit board 1 that drives the three-phase synchronous motor 2. The printed circuit board 1 drives the three-phase synchronous motor 2 in response to the torque detected by the torque sensor 42. The three-phase synchronous motor 2 outputs a torque for assisting in a steering operation on the basis of a command in response to the detected torque. The torque output from the three-phase synchronous motor 2 assists in a steering force via a steering assist mechanism 43 and is output to a steering mechanism 44. The steering mechanism 44 then steers tires 45.

As embodiments of a control device that controls the electric power steering apparatus, control of the drive device 3 that outputs the torque for assisting in the steering operation on the basis of the torque detected by the torque sensor 42 and of the printed circuit board 1 and the three-phase synchronous motor 2 that constitute the drive device 3 will be described hereinafter. The present invention to be described in a plurality of the following embodiments is characterized in that position estimation means based on either a virtual neutral point potential or a neutral point potential is applied to an electric power steering apparatus frequently using a zero speed or a low speed equal to or lower than 10% of a rated speed. It is thereby possible to continue assisting in the steering operation by driving the three-phase synchronous motor even in a zero speed or low speed operating range.

First Embodiment

FIG. 1 illustrates a configuration of the drive device 3 according to a first embodiment. A configuration of the printed circuit board 1 that is characteristic of a control device according to the present embodiment will be described with reference to FIG. 1.

The printed circuit board 1 of the present embodiment includes an inverter 12, pulse width modulation signal output means 13, a virtual neutral point circuit 14, a current/voltage detection unit 15, a rotational position estimation unit 16A, and a command signal computing unit 17. The inverter 12 converts a DC current input from a DC power supply 11 into a three-phase AC current and outputs the three-phase AC current to the three-phase synchronous motor 2. Switching elements Sup to Swn constituting the inverter 12 are controlled on the basis of a pulse width modulation signal computed by the pulse width modulation signal output means 13.

The rotational position estimation unit 16A estimates rotational position information on the three-phase synchronous motor 2 on the basis of a virtual neutral point potential Vn0 input from the virtual neutral point circuit 14. An operation of the rotational position estimation unit 16A will be described later with reference to FIG. 2. An output signal from the rotational position estimation unit 16A is denoted by symbol θ1. The command signal computing unit 17 computes the pulse width modulation signal on the basis of the rotational position information estimation value θ1 and outputs the pulse width modulation signal. The output pulse width modulation signal is output to the inverter 12 via the pulse width modulation signal output means 13.

Figure 2:
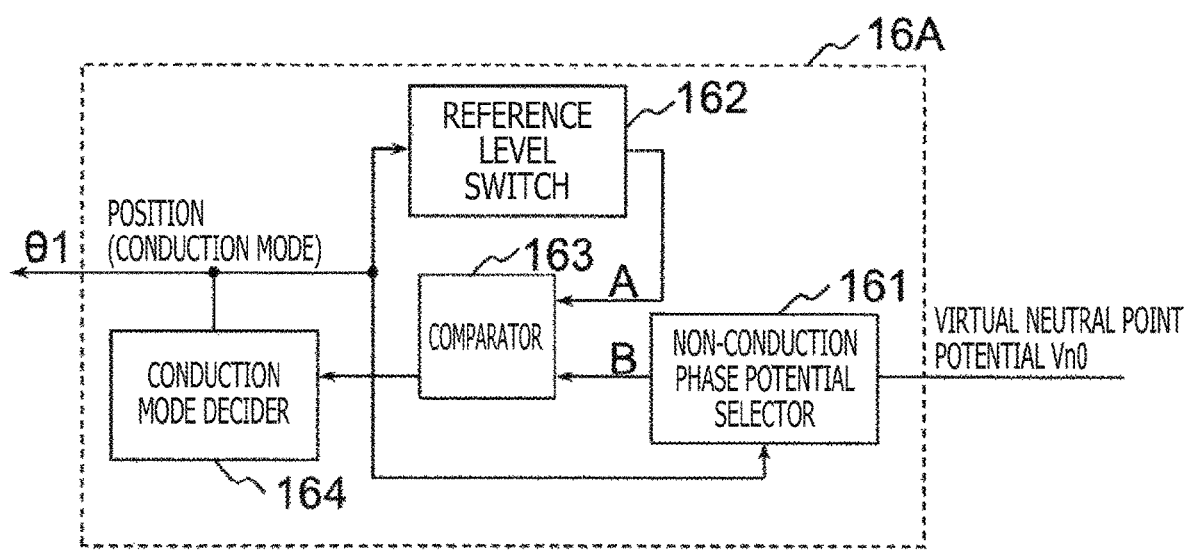
FIG. 2 is a block diagram illustrating a rotational position estimation unit 16A based on a virtual neutral point potential.

FIG. 2 is a block diagram illustrating a configuration of the rotational position estimation unit 16A. The rotational position estimation unit 16A estimates the rotational position estimation θ1 on the basis of the virtual neutral point potential Vn0. While the position is estimated on the basis of the virtual neutral point potential in the present embodiment, the position may be estimated on the basis of the neutral point potential.

The rotational position estimation unit 16A is configured with a non-conduction phase potential selector 161, a reference level switch 162, a comparator 163, and a conduction mode decider 164.

The non-conduction phase potential selector 161 samples and holds the virtual neutral point potential in response to a mode command output from the conduction mode decider 164. The reference level switch 162 sets a positive-side reference voltage and a negative-side reference voltage in response to the mode command, compares the non-conduction phase potential selector 161 and the reference level switch 162, and inputs a comparison result to the conduction mode decider 164. With this configuration, a necessary potential in a non-conduction phase is obtained. The configuration described above can realize position detection at a low speed in a sensorless manner. The control device for the electric power steering apparatus in the present embodiment allows driving of the three-phase synchronous motor in a state, in which a position detector is not present, at the zero speed or the low speed equal to or lower than 10% of the rated speed at which the three-phase synchronous motor is frequently used in the electric power steering apparatus, and allows outputting of the torque.

Figure 3:
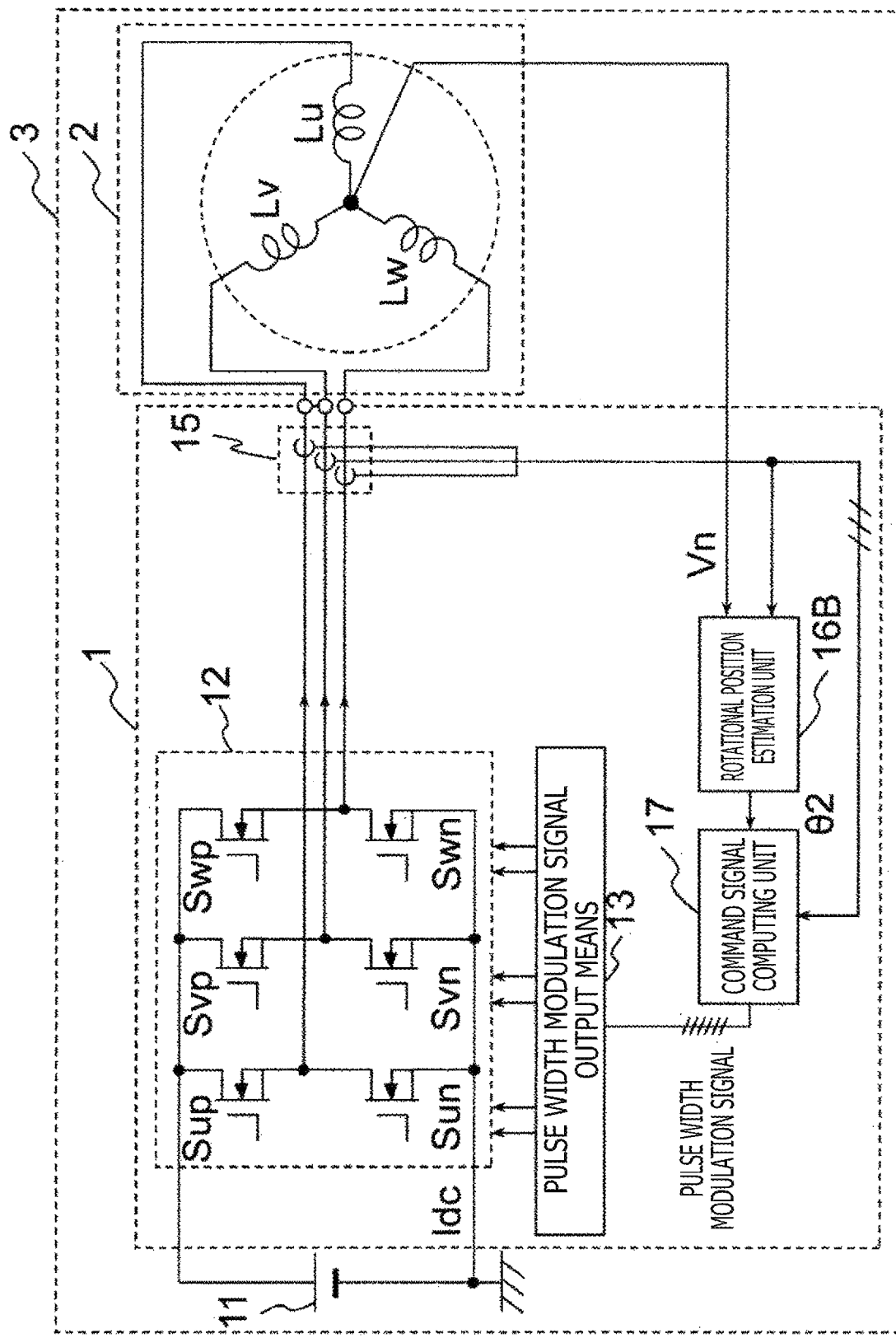
FIG. 3 is a configuration diagram of the drive device to which a rotational position estimation unit 16B based on a neutral point potential is applied.

While a method of computing the mode command from the virtual neutral point potential and estimating the position by the rotational position estimation unit 16A is introduced, this method is based on 120-degree conduction and, therefore, causes a current waveform distortion. Owing to this, the rotational position estimation unit 16A may be replaced by a rotational position estimation unit 16B that is position estimation means based on the neutral point potential at which a neutral point potential of three-phase windings is derived, as shown in FIG. 3.

Second Embodiment

Figure 4:
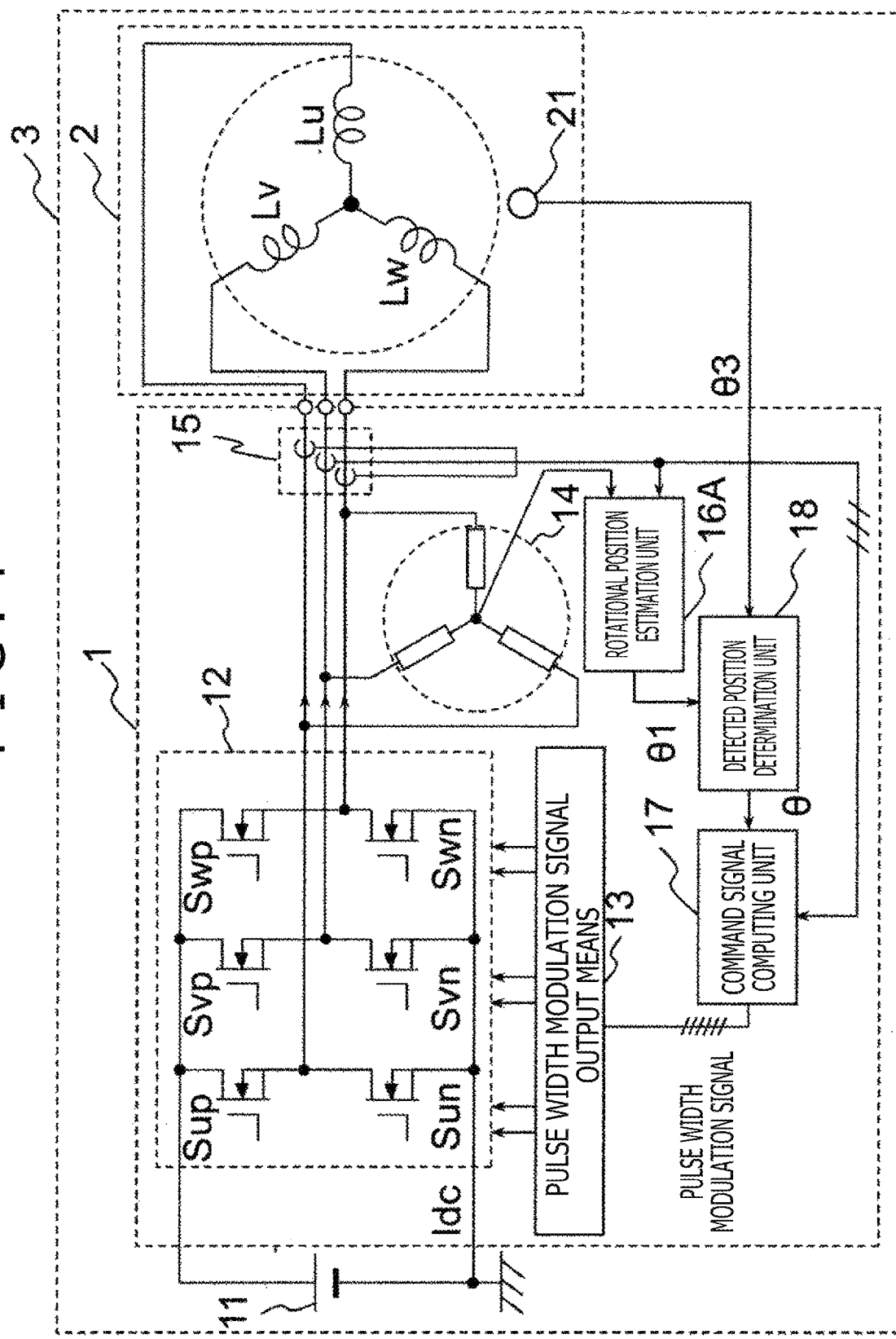
FIG. 4 is a configuration diagram of a drive device according to a second embodiment.

FIG. 4 is a block diagram illustrating a configuration of the drive device 3 according to a second embodiment. The drive device 3 of the present embodiment is characterized by including a position detector 21 that is hardware and a position detection determiner 18.

The electric power steering apparatus is provided with a position detector that detects a position of a rotor of the three-phase synchronous motor 2 with a view to reliability of position detection. In the present embodiment, an output $\theta 3$ from the position detector 21 is used when the detected position determination unit 18 determines that the position detected by the position detector 21 is a normal signal, and the output $\theta 1$ from the rotational position estimation unit 18 is used when the position detected by the position detector 21 is an abnormal signal.

Figure 5:
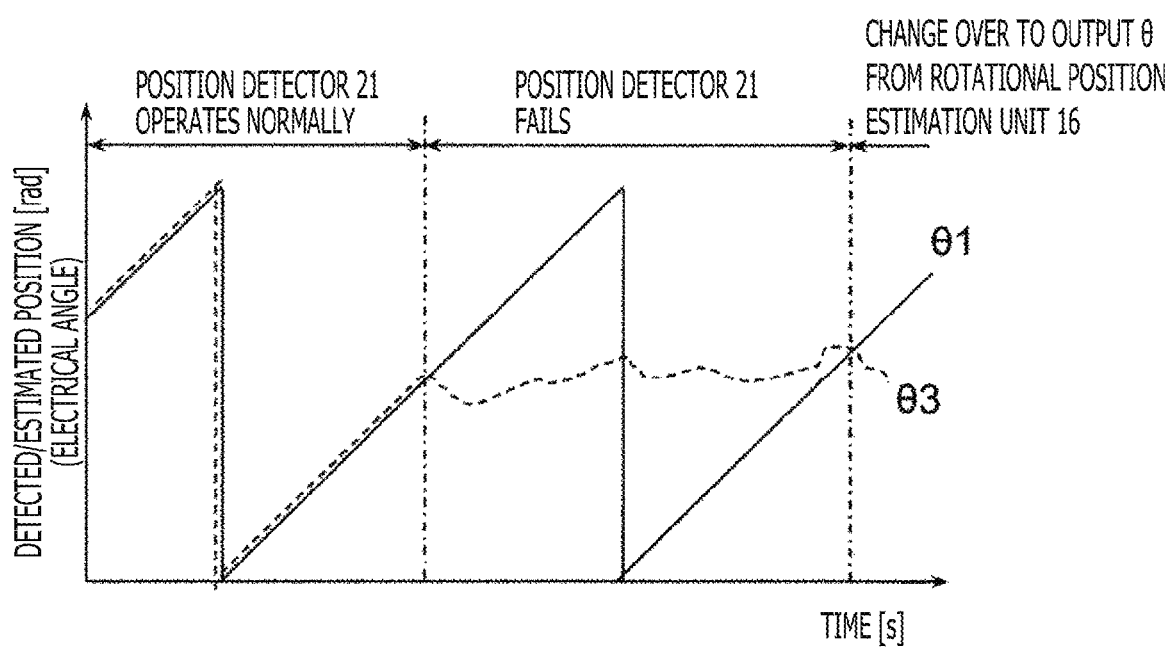
FIG. 5 illustrates processes performed by a detected position determination unit 18.

If an output is suddenly changed from the output $\theta 3$ from the position detector 21 to the output $\theta 1$ from the rotational position estimation unit 18 when the position signal detected by the position detector 21 turns into the abnormal signal from the normal signal, step-out, vibration and/or noise occurs in the motor. To address the problem, when determining that a divergence between the output $\theta 3$ from the position detector 21 and the output $\theta 1$ from the rotational position estimation unit 18 is generated and that the position detector fails, the detected position determination unit 18 switches the position signal at timing at which the position $\theta 3$ from the position detector 21 generally matches with the position $\theta 1$ from the rotational position estimation unit 16, as shown in FIG. 5.

With such a configuration, it is possible to use not only positional information by the position detector but also positional information by the position estimation unit and configure a redundant electric power steering apparatus at a low cost. Furthermore, it is possible to obtain the electric power steering apparatus ensuring a low switching shock to prevent the driver from feeling discomfort even when the position detector 21 fails.

When the signal from the position detector 21 is the normal signal, the detected position determination unit 18 compares the output $\theta 1$ from the rotational position estimation unit 16 with the output $\theta 3$ from the position detector 21 and synchronizes the signal to that from the position detector 21. It is thereby possible to adjust an individual difference among three-phase synchronous motors in magnetic saturation characteristics that are used in the rotational position estimation unit 16. As a consequence, it is possible to realize adjustment of the individual difference among a plurality of three-phase synchronous motors at a low cost.

While the rotational position estimation unit 16 is described in FIG. 4 according to the present embodiment while referring to the position estimation unit 16A based on the virtual neutral point potential, the position estimation unit 16B based on the neutral point potential may be used.

Third Embodiment

Figure 6:
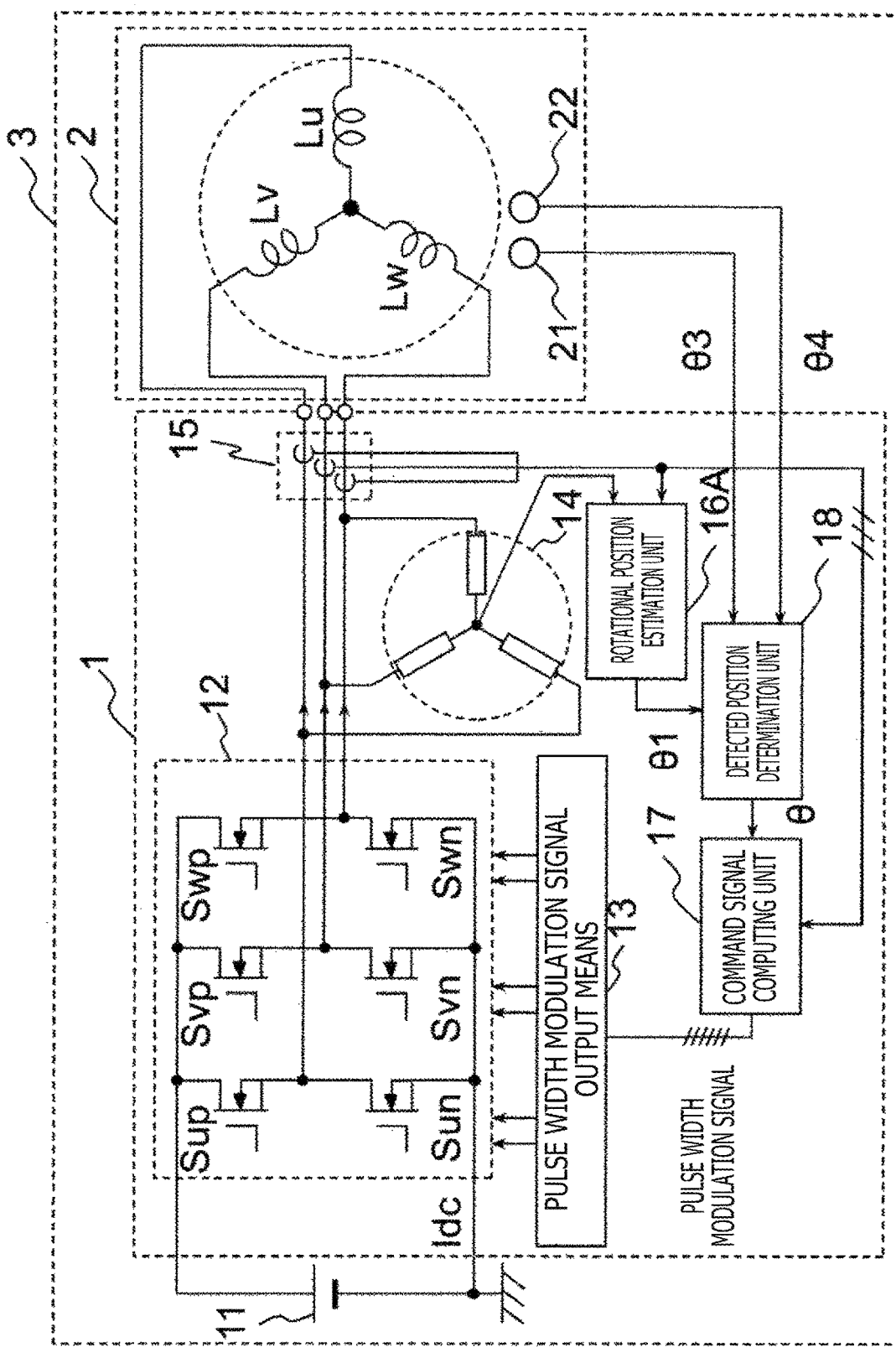
FIG. 6 is a configuration diagram of a drive device according to a third embodiment.

FIG. 6 is a block diagram illustrating a configuration of the drive device 3 according to a third embodiment. The drive device 3 of the present embodiment is characterized, compared with the second embodiment, by including not only the position detector 21 but also a position detector 22 to constitute a position detection system into a redundant configuration.

In many cases, the electric power steering apparatus is provided with two or more position detectors that detect the position of the rotor of the three-phase synchronous motor 2 with a view to improving the reliability of position detection. In the present embodiment, a case in which the number of the position detectors is two will be described as a typical example.

With a configuration of the two position detectors, if one of the position detectors has failed, it is difficult to discriminate which position detector has failed. To address the problem, the rotational position estimation unit 16A is used in addition to the two position detectors according to the present embodiment, so that it is possible to determine which has failed, the position detector 21 or 22. It is, therefore, possible to drive the electric power steering apparatus using the normal position detector.

Figure 7:
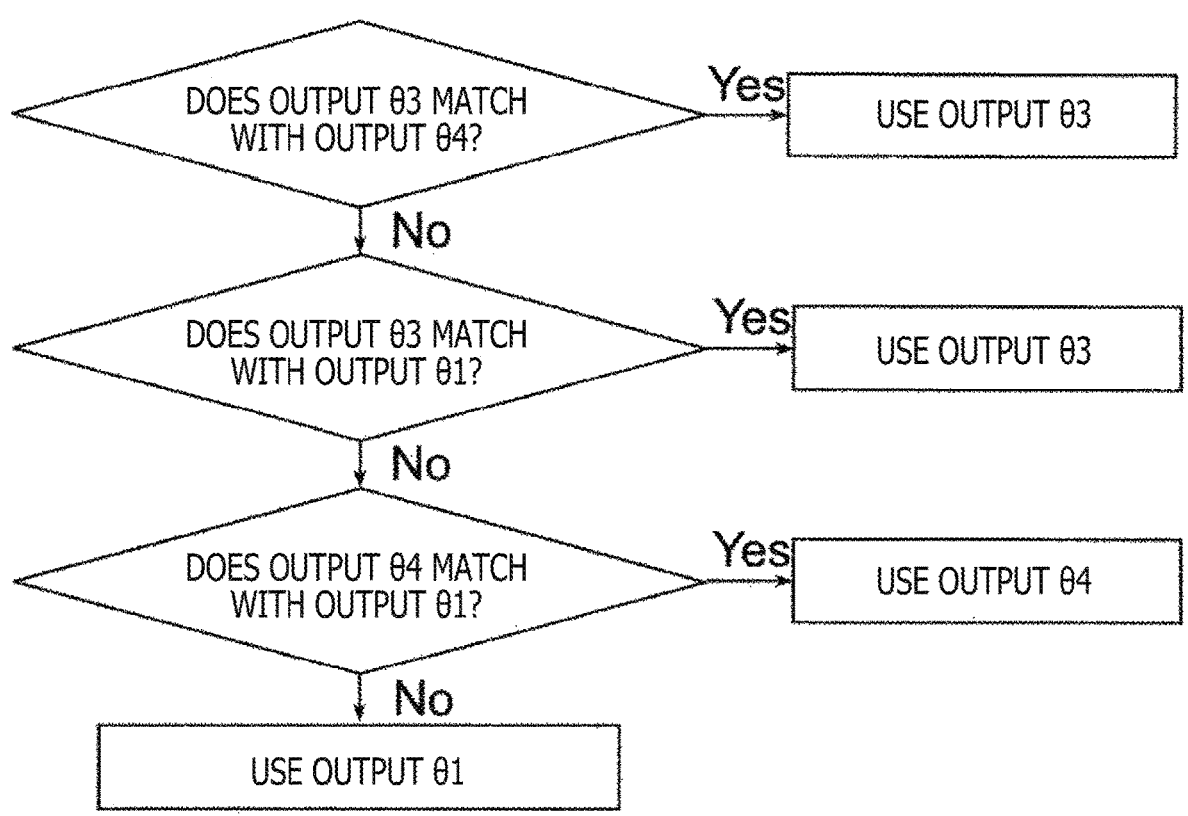
FIG. 7 is a flowchart illustrating a process configuration of rotational position comparison means 18 of FIG. 6.

FIG. 7 is a flowchart illustrating a process configuration of the detected position determination unit 18. First, the detected position determination unit 18 compares output signals from the position detectors 21 and 22 with each other. When the output signals match with each other, the signal from the position detector 21 is used. When the output signal $\theta 3$ from the position detector 21 does not match with an output signal $\theta 4$ from the position detector 22, the detected position determination unit 18 compares the output signal $\theta 1$ from the rotational position estimation unit 16A with the output signal $\theta 3$ and/or $\theta 4$. When the output signal $\theta 3$ from the position detector 21 matches with the output signal $\theta 1$ from the rotational position estimation unit 16A, then the detected position determination unit 18 determines that the position detector 21 is normal and the output signal $\theta 3$ from the position detector 21 is used. When the output signal $\theta 4$ from the position detector 22 matches with the output signal $\theta 1$ from the rotational position estimation unit 16A, then the detected position determination unit 18 determines that the position detector 22 is normal and the output signal θ4 from the position detector 22 is used. Neither the output signal θ3 from the position detector 21 nor the output signal θ4 from the position detector 22 matches with the output signal θ1 from the rotational position estimation unit 16A, the output signal θ1 from the rotational position estimation unit 16A is used.

With such a configuration, it is possible for the rotational position estimation unit to identify which of the position detectors has failed even when one of the two position detectors has failed. Furthermore, it is possible to realize continuous assistance at a low cost using the position detector by using the positional information from the other position detector.

Fourth Embodiment

Figure 8:
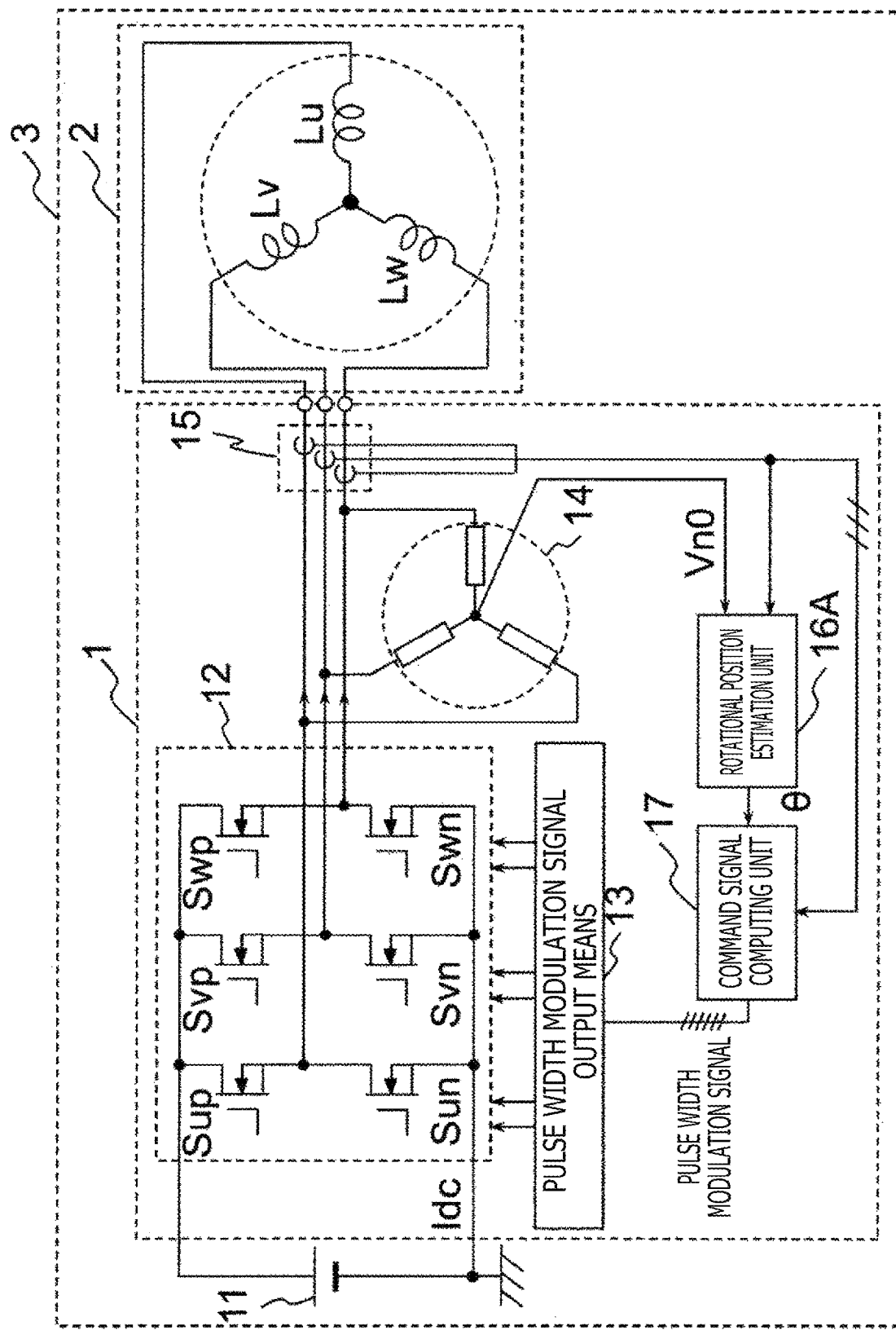
FIG. 8 is a configuration diagram of a drive device according to a fourth embodiment.

FIG. 8 is a block diagram illustrating a configuration of the drive device 3 according to a fourth embodiment. In the present embodiment, a method particularly based on the virtual neutral point potential 14 by the rotational position estimation unit will be described.

Figure 9:
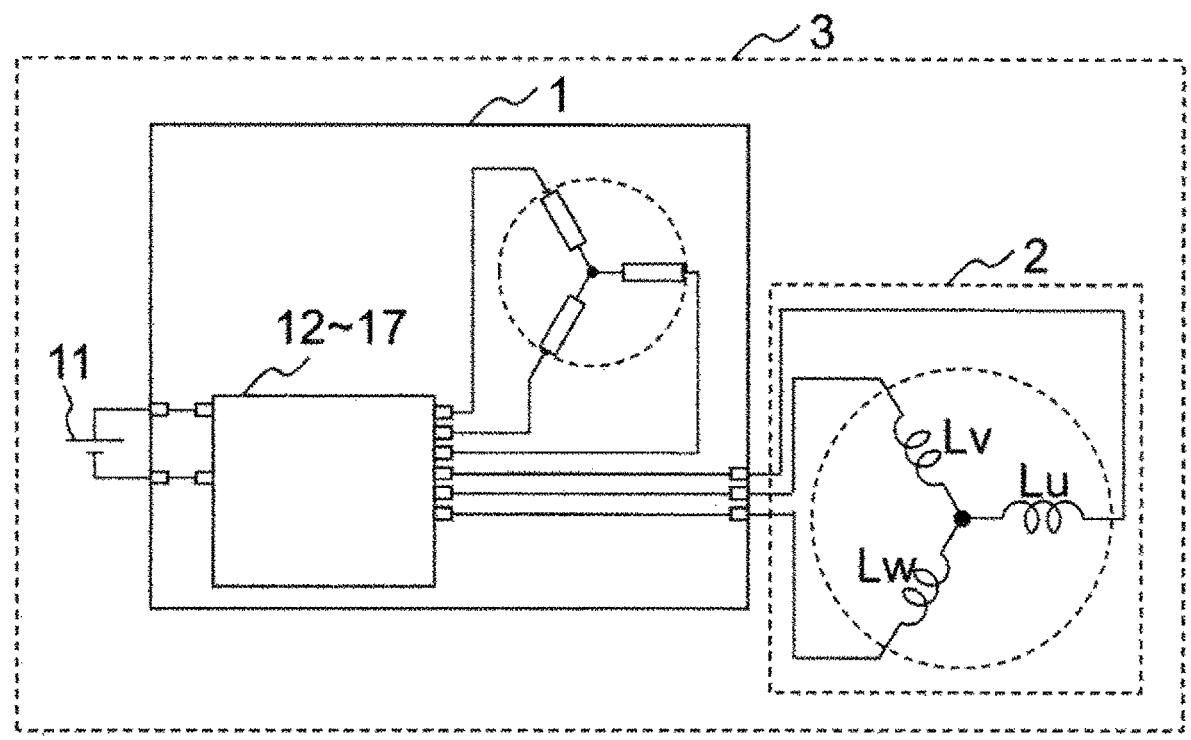
FIG. 9 illustrates a configuration of a printed circuit board 1 according to the fourth embodiment.

The rotational position estimation unit 16A is driven on the basis of the virtual neutral point potential 14. As shown in FIG. 9, the virtual neutral position circuit 14 is installed on the printed circuit board 1 on which microcomputers are mounted. Such a configuration can dispense with a derivation line for the neutral point potential of the three-phase windings and facilitate connecting the printed circuit board 1 to the three-phase synchronous motor 2. Furthermore, installing the virtual neutral point circuit 14 on the printed circuit board 1 can prevent operation errors due to interconnection noise or an increase of ripples in detected voltages. In addition, installing the virtual neutral point circuit 14 on the printed circuit board 1 can reduce interconnection lengths and achieve cost reduction.

A resistance of this virtual neutral point circuit 14 is configured to have a resistance value 100 times or more as high as that of a winding resistance of the three-phase synchronous motor 2. By making the winding resistance different from the resistance of the virtual neutral point circuit as described above, the resistance of the virtual neutral point circuit can be separated from an impedance of the three-phase windings. Therefore, it is possible to highly accurately detect a fluctuation of the virtual neutral point potential due to magnetic saturation and improve position accuracy of the detected position estimation unit 16.

The rotational position estimation unit 16A driven on the basis of the virtual neutral point potential 14 is driven under 120-degree conduction control. Owing to this, accuracy of an electrical angle is only ±30 degrees, so that a position error is large within a control cycle at high speed rotation, resulting in occurrence of a counter torque or step-out. To address the problems, when the rotational speed of the three-phase synchronous motor 2 exceeds a predetermined rotational speed, for example, exceeds 3000 rpm, a current is set to zero to stop assistance. It is thereby possible to realize stable driving of the power steering apparatus.

Fifth Embodiment

Figure 10:
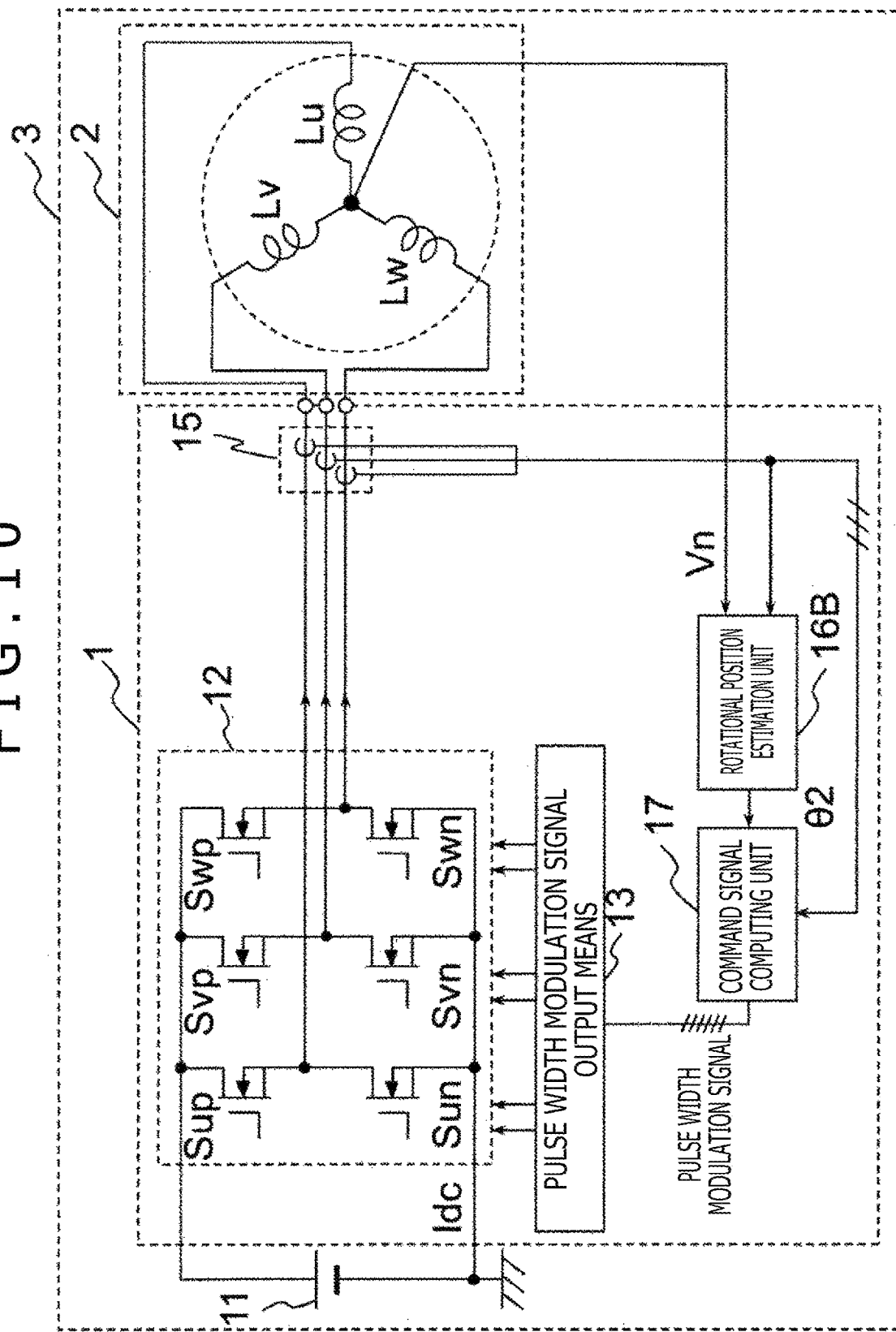
FIG. 10 is a configuration diagram of a drive device according to a fifth embodiment.

FIG. 10 is a block diagram illustrating a configuration of the drive device 3 according to a fifth embodiment. In the present embodiment, the rotational position estimation unit 16 is configured to use, in particular, the neutral point potential of the three-phase windings of the three-phase synchronous motor 2.

With such a configuration, it is possible to realize driving with a sinusoidal wave and reduce vibration and noise due to torque ripples, differently from the position estimation based on the virtual neutral point potential.

Sixth Embodiment

Figure 11:
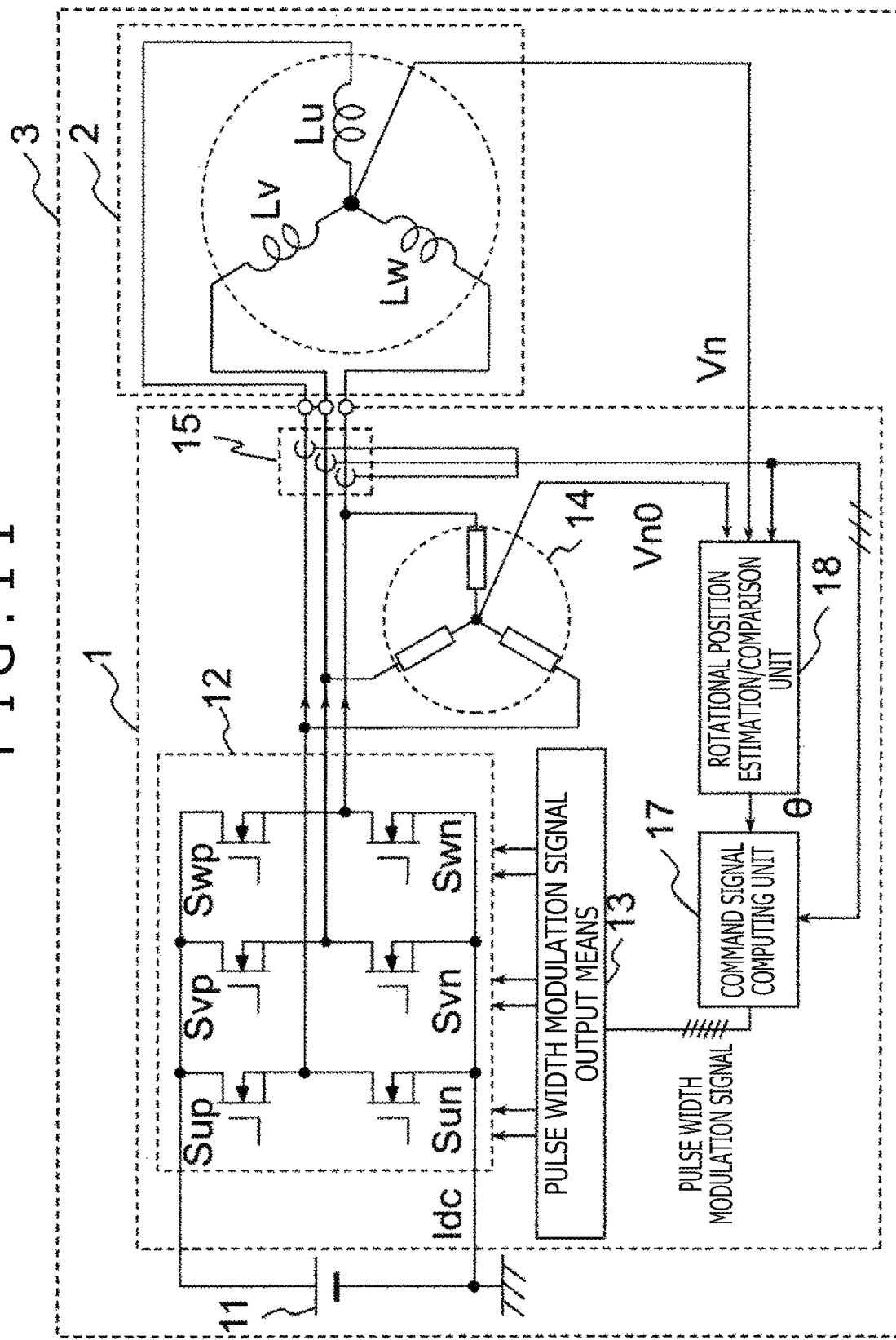
FIG. 11 is a configuration diagram of a drive device according to a sixth embodiment.

FIG. 11 is a block diagram illustrating a configuration of the drive device 3 according to a sixth embodiment. The present embodiment is characterized by using two signals of the neutral point potential of the three-phase windings and the virtual neutral point potential of the three-phase synchronous motor 2.

FIG. 12 illustrates a configuration of the rotational position estimation/comparison unit 18. The rotational position estimation/comparison unit 18 is configured with the rotational position estimation unit 16A that estimates the position on the basis of the virtual neutral point potential, the rotational position estimation unit 16B that estimates the position on the basis of the neutral point potential, and the rotational position estimation/comparison unit 18 that detects a failure in the virtual neutral point potential circuit or breaking of the neutral point potential derivation line.

The rotational position estimation/comparison unit 18 compares the virtual neutral point potential with the neutral point potential, thereby detecting an open failure in a resistor installed on the virtual neutral point potential circuit or breaking in an open failure in the neutral point potential derivation line.

An outline of detection of the breaking in the open failure in the neutral point potential derivation line will be described with reference to FIG. 13. FIG. 13 illustrates waveforms of a voltage applied to an upper arm in each phase of the inverter 2, the neutral point potential Vn, and the virtual neutral point potential Vn0. In FIG. 13, the neutral point potential Vn is indicated by a broken line and the virtual neutral point potential Vn0 is indicated by a solid line.

As shown in an upper stage of FIG. 13, when the neutral point potential derivation line is not broken, the virtual neutral point potential Vn0 matches with the neutral point potential Vn in a period in which all the upper arms of the inverter 2 are turned on. However, as shown in a lower stage of FIG. 13, when the neutral point potential derivation line is broken in the open failure, the virtual neutral point potential does not match with the neutral point potential. In this way, comparing the neutral point potential with the virtual neutral point potential enables detection of the breaking.

When one position estimation unit fails out of the rotational position estimation unit 16A that estimates the position on the basis of the virtual neutral point potential and the rotational position estimation unit 16B that estimates the position on the basis of the neutral point potential, it is possible to continue assisting in the steering operation by changing over to the other rotational position estimation unit that does not fail. The virtual neutral point potential and the neutral point potential are provided and the two potentials are compared with each other, whereby it is possible to detect the neutral point potential and the breaking of the virtual neutral point potential derivation line without the need to provide a circuit of a different system.

Seventh Embodiment

Figure 14:
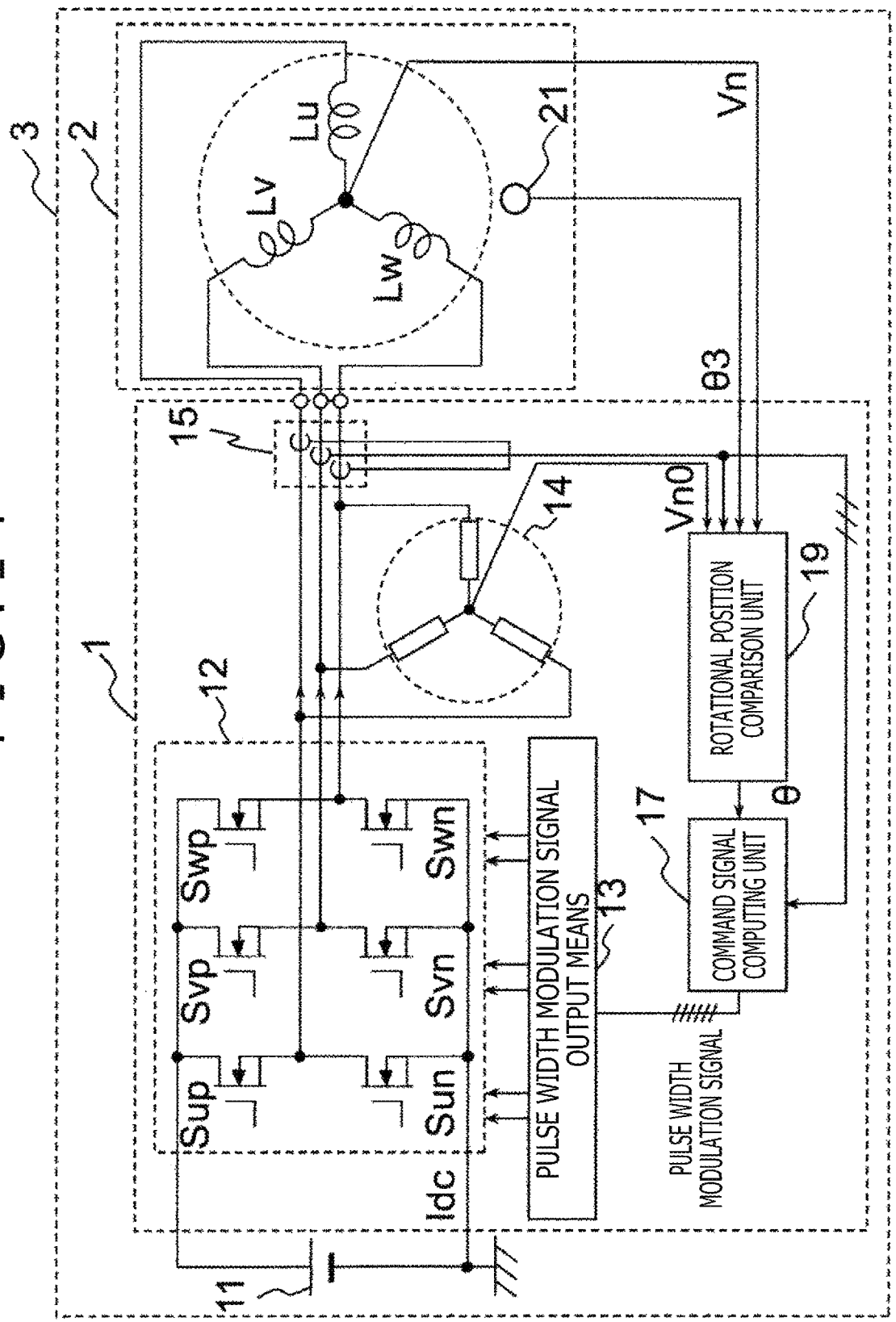
FIG. 14 is a configuration diagram of a drive device according to a seventh embodiment.

FIG. 14 is a block diagram illustrating a configuration of the drive device 3 according to a seventh embodiment. The drive device of the present embodiment is characterized by using not only the two signals, i.e., the neutral point potential and the virtual neutral point potential but also the signal from the rotational position detection unit 21.

Figure 15:
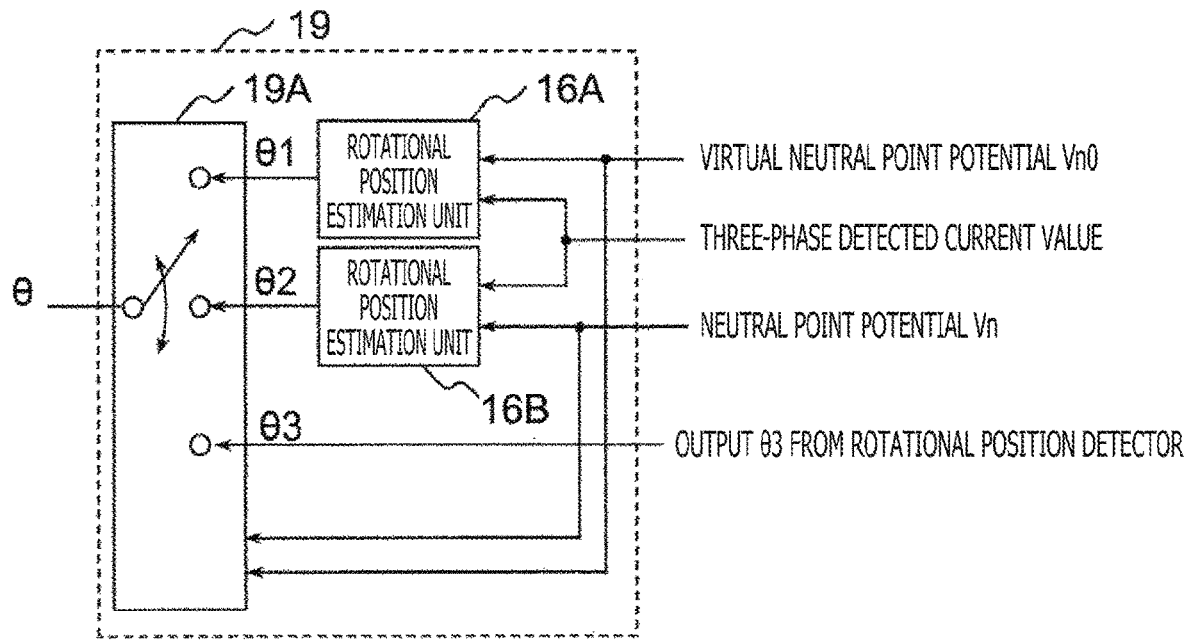
FIG. 15 is a block diagram illustrating a configuration of a rotational position comparison unit 19.

FIG. 15 illustrates a configuration of a rotational position comparison unit 19. The rotational position comparison unit 19 is configured with the rotational position estimation unit 16A that estimates the position on the basis of the virtual neutral point potential, the rotational position estimation unit 16B that estimates the position on the basis of the neutral point potential, and rotational position comparison means 19 that compares the outputs 16A and 16B from the rotational position estimation units with the output θ3 from the rotational position detector.

Figure 16:
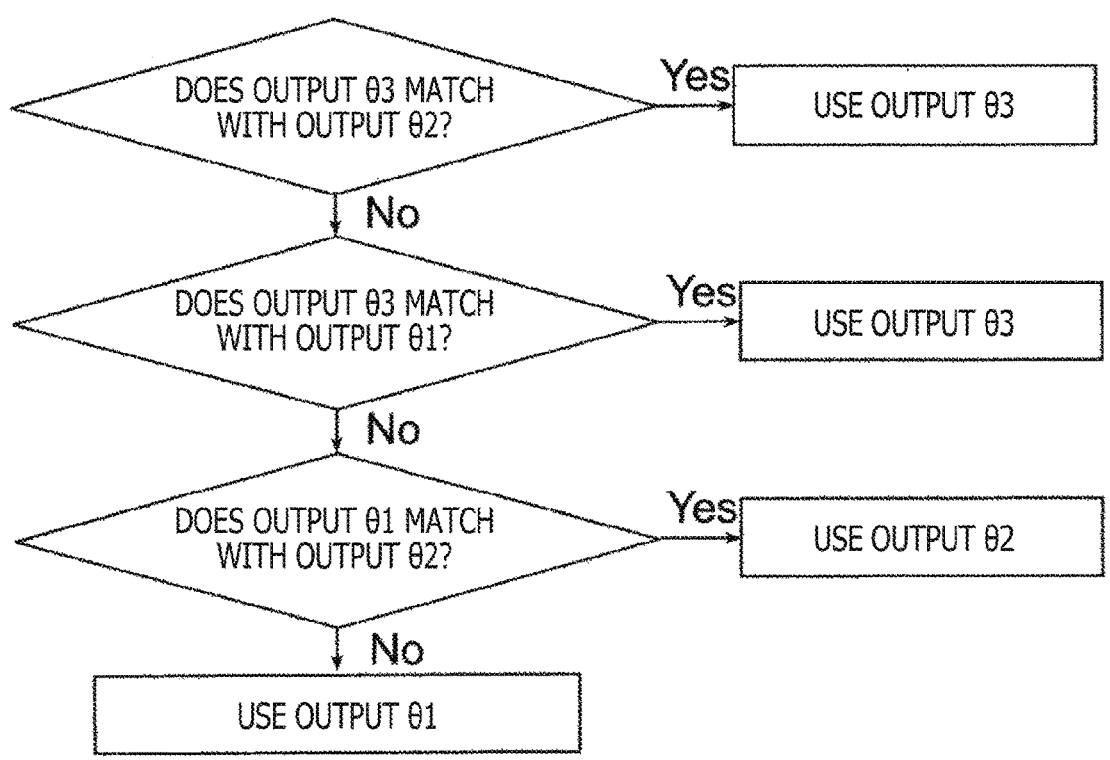
FIG. 16 is a flowchart illustrating a process configuration of rotational position comparison means 19A of FIG. 15.

FIG. 16 is a flowchart illustrating a process configuration of the rotational position comparison means 19. The rotational position comparison means 19 compares the output from the position detector 21 with the output from the rotational position estimation unit 16B, and determines which of the two outputs has failed by the output from the rotational position estimation unit 16A. The rotational position comparison means 19A compares the output signal θ3 from the position detector 21 with the output signal θ2 from the rotational position estimation unit 16B, and the signal from the position detector 21 is used when the signals match with each other. When the output signal θ3 from the position detector 21 does not match with the output signal θ2 from the rotational position estimation unit 16B, the rotational position comparison means 19A compares the output signal θ3 from the position detector 21 with the output signal θ1 from the rotational position estimation unit 16A. When the output signal θ3 from the position detector 21 matches with the output signal θ1 from the rotational position estimation unit 16A, then the rotational position comparison means 19A determines that the position detector 21 is normal and the output signal θ3 from the position detector 21 is used. When the output signal θ2 from the rotational position estimation unit 16B matches with the output signal θ1 from the rotational position estimation unit 16A, the output signal θ2 from the rotational position estimation unit 16B is used. Neither the output signal θ3 from the position detector 21 nor the output signal θ2 from the rotational position estimation unit 16B matches with the output signal θ1 from the rotational position estimation unit 16A, the output signal θ1 from the rotational position estimation unit 16A is used.

With such a configuration, it is possible to ensure a triple redundant system at a low cost albeit a configuration of using the one position detector that is the hardware. While an example in which the number of the rotational position detectors is one is introduced in the present embodiment, it is possible to achieve further redundancy by using two or more rotational position detectors.

DESCRIPTION OF REFERENCE CHARACTERS

1: Printed circuit board
11: DC power supply
12: Inverter
13: Pulse width modulation signal output means
14: Virtual neutral point circuit
15: Current detection unit, voltage detection unit
16: Rotational position estimation unit
161: Non-conduction phase potential selector
162: Reference level switch
163: Comparator
164: Conduction mode decider
17: Command signal computing unit
18: Rotational position estimation/comparison unit
2: Three-phase synchronous motor
3: Drive device
4: Electric power steering apparatus
41: Steering wheel
42: Torque sensor
43: Steering assist mechanism
44: Steering mechanism
45: Tire

The invention claimed is:

1. A control device for controlling an electric power steering apparatus using a three-phase synchronous motor as a force assisting in a steering operation, comprising:
a rotational position estimation unit that estimates a position of a rotor of the three-phase synchronous motor on the basis of a neutral point potential or a virtual neutral point potential of the three-phase synchronous motor;
a command signal computing unit that computes a command signal to the three-phase synchronous motor based at least on the position of the rotor estimated by the rotational position estimation unit; and
a rotational position detector that detects the position of the rotor of the three-phase synchronous motor, and that inputs said position to the control device, wherein
the control device is configured to detect a divergence between an output from the rotational position detector and an output from the rotational position estimation unit, and
when the control device has detected said divergence and that the rotational position detector fails, the rotational position estimation unit changes an estimated position of the rotor, at a timing at which the position from the rotational position detector matches with the position from the rotational position estimation unit.

2. The control device for the electric power steering apparatus according to claim 1, wherein the command signal computing unit computes the command signal to the three-phase synchronous motor on the basis of the position of the rotor estimated by the rotational position estimation unit, and
when the position signal is abnormal, the command signal computing unit computes the command signal to the three-phase synchronous motor on the basis of the position of the rotor estimated by the rotational position estimation unit.

3. The control device for the electric power steering apparatus according to claim 2, wherein
a first position signal detected by a first rotational position detector that detects the position of the rotor of the three-phase synchronous motor and a second position signal detected by a second rotational position detector that detects the position of the rotor of the three-phase synchronous motor are input to the control device as the position signal.

4. The control device for the electric power steering apparatus according to claim 2, wherein
the control device adjusts the position of the rotor estimated by the rotational position estimation unit based on the position of the rotor detected by the rotational position detector.

5. The control device for the electric power steering apparatus according to claim 2, wherein
when it is determined that the position signal is abnormal, the control device computes the command signal to the three-phase synchronous motor based on the position of the rotor estimated by the rotational position estimation unit while logging the position of the rotor detected by the rotational position detector before abnormality is detected.

6. The control device for the electric power steering apparatus according to claim 2, wherein
when the position signal is normal, the command signal computing unit computes the command signal to the three-phase synchronous motor on the basis of the position of the rotor detected by the rotational position detector.

7. The control device for the electric power steering apparatus according to claim 1, further comprising:
a virtual neutral point circuit having multiple resistance values and that outputs the virtual neutral point potential of the three-phase synchronous motor, wherein
the rotational position estimation unit estimates the position of the rotor of the three-phase synchronous motor on the basis of the virtual neutral point potential output from the virtual neutral point circuit.

8. The control device for the electric power steering apparatus according to claim 7, wherein
the virtual neutral point circuit is mounted on a printed circuit board on which a microcomputer driving the control device is mounted.

9. The control device for the electric power steering apparatus according to claim 7, wherein
when a rotational speed of the three-phase synchronous motor exceeds a predetermined rotational speed, the three-phase synchronous motor is stopped.

10. The control device for the electric power steering apparatus according to claim 7, wherein
each resistance value of the virtual neutral point circuit is set to be 100 times or more as high as a resistance value of a winding resistance of the three-phase synchronous motor.

11. The control device for the electric power steering apparatus according to claim 1, further comprising:
a neutral point potential derivation line that outputs the neutral point potential of the three-phase synchronous motor to the command signal computing unit, wherein
the rotational position estimation unit estimates the position of the rotor of the three-phase synchronous motor on the basis of the neutral point potential of the three-phase synchronous motor.

12. The control device for the electric power steering apparatus according to claim 1, further comprising:
a virtual neutral point circuit that outputs the virtual neutral point potential of the three-phase synchronous motor; and
a neutral point potential derivation line that outputs the neutral point potential of the three-phase synchronous motor to the command signal computing unit, wherein
breaking of the neutral point potential derivation line is detected by comparing the neutral point potential of the three-phase synchronous motor with the virtual neutral point potential of the three-phase synchronous motor.

13. The control device for the electric power steering apparatus according to claim 1, wherein
the rotational position estimation unit includes a first rotational position estimation unit and a second rotational position estimation unit, and
the command signal computing unit computes the command signal to the three-phase synchronous motor on the basis of the position of the rotor estimated by either the first rotational position estimation unit or the second rotational position estimation unit.

14. The control device for the electric power steering apparatus according to claim 13, wherein
the command signal computing unit computes the command signal to the three-phase synchronous motor on the basis of the position of the rotor detected by the rotational position detector or the position of the rotor estimated by either the first rotational position estimation unit or the second rotational position estimation unit.

15. The control device for the electric power steering apparatus according to claim 1, wherein
the rotational position estimation unit estimates the position of the rotor of the three-phase synchronous motor on the basis of only either the neutral point potential or the virtual neutral point potential of the three-phase synchronous motor.

16. An electric power steering apparatus, further comprising:
a steering operation mechanism that steers steered wheels in response to a steering handling;
a three-phase synchronous motor that applies a steering force to the steering operation mechanism;
a control device that controls the three-phase synchronous motor to be driven;
a rotational position estimation unit that estimates a position of a rotor of the three-phase synchronous motor on the basis of a neutral point potential or a virtual neutral point potential of the three-phase synchronous motor;
a command signal computing unit that computes a command signal to the three-phase synchronous motor on the basis of the position of the rotor estimated by the rotational position estimation unit; and
a rotational position detector that detects the position of the rotor of the three-phase synchronous motor, and that inputs said position to the control device, wherein
the control device is configured to detect a divergence between an output from the rotational position detector and an output from the rotational position estimation unit,
when the control device has detected said divergence and that the rotational position detector fails, the rotational position estimation unit changes an estimated position of the rotor, at a timing at which the position from the rotational position detector matches with the position from the rotational position estimation unit.

17. The electric power steering apparatus according to claim 16,
wherein
the command signal computing unit computes the command signal to the three-phase synchronous motor on the basis of at least one of the position of the rotor detected by the rotational position detector and the position of the rotor estimated by the rotational position estimation unit, and
when the position signal is abnormal, the command signal computing unit computes the command signal to the three-phase synchronous motor on the basis of the position of the rotor estimated by the rotational position estimation unit.

18. The electric power steering apparatus according to claim 17, further comprising:
a virtual neutral point circuit that outputs the virtual neutral point potential of the three-phase synchronous motor, wherein
the rotational position estimation unit estimates the position of the rotor of the three-phase synchronous motor on the basis of the virtual neutral point potential output from the virtual neutral point circuit.

19. The electric power steering apparatus according to claim 18, wherein
the virtual neutral point circuit is mounted on a printed circuit board on which a microcomputer driving the control device is mounted.

* * * * *